Dec. 18, 1956    G. T. JOBE ET AL    2,774,806
PRIMARY BATTERY
Filed June 12, 1953    2 Sheets-Sheet 1
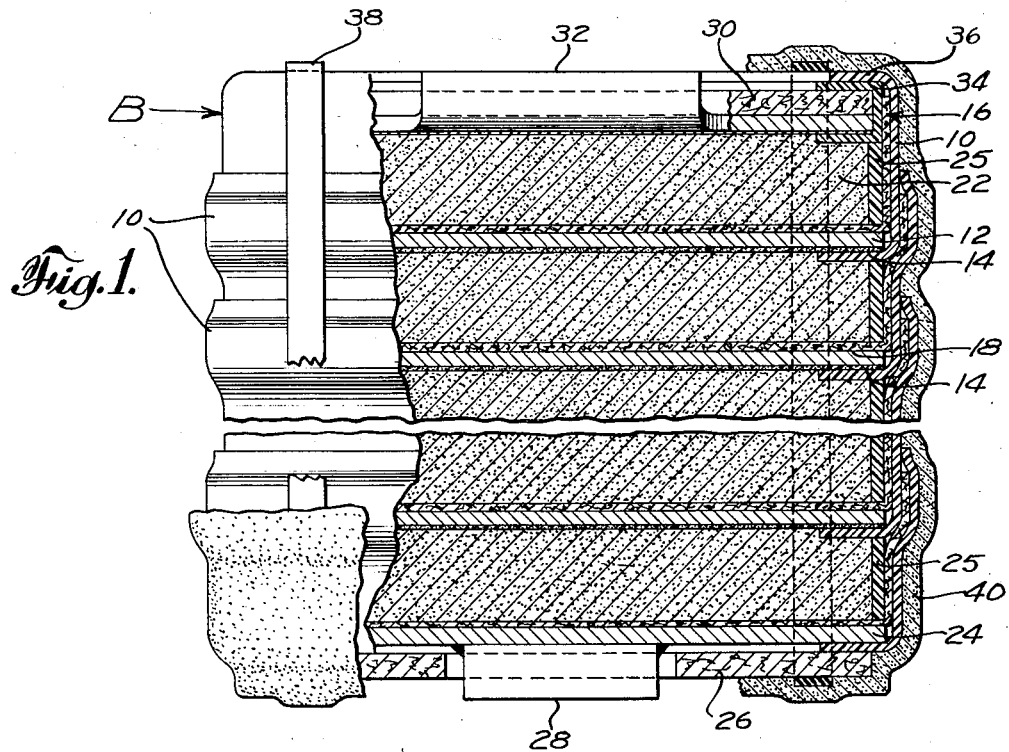
*Fig.1.*
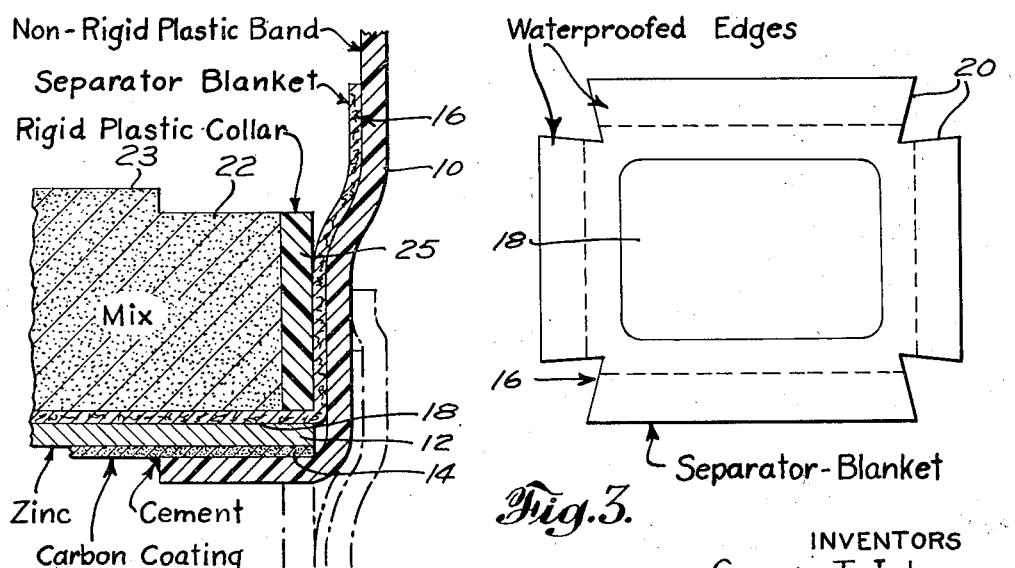
*Fig.2.*
*Fig.3.*
INVENTORS
George T. Jobe
Fredrick J. Weber
Albert F. Vinal
BY John F. Hohmann
ATTORNEY Dec. 18, 1956 G. T. JOBE ET AL 2,774,806
PRIMARY BATTERY
Filed June 12, 1953 2 Sheets-Sheet 2

INVENTORS
George T. Jobe
Fredrick J. Weber
Albert F. Vinal
BY John F. Hohmann
ATTORNEY

United States Patent Office 2,774,806
Patented Dec. 18, 1956

2,774,806

PRIMARY BATTERY

George T. Jobe, Cleveland, Fredrick J. Weber, Parma, and Albert F. Vinal, Shaker Heights, Ohio, assignors to Union Carbide and Carbon Corporation, a corporation of New York Application June 12, 1953, Serial No. 361,318

2 Claims. (Cl. 136—111)

This invention relates to a primary galvanic battery of the so-called "layer type," which battery is particularly adapted for use at low temperatures.

It has long been realized that dry cells and batteries thereof of the conventional carbon-zinc-manganese dioxide-ammonium chloride system are incapable, without modification, of rendering the service at low temperatures that they yield in the normal temperature ranges of temperature climates. With the development of modern electronic devices best powered by primary batteries because of their compactness and ready portability and the concurrently increasing entry of man into frigid zones such as the upper atmosphere, the stratosphere, and frigid areas of the earth's surface, the need for primary cells and batteries capable of operating satisfactorily at very low temperatures has grown apace. Consequently, modifications of the conventional system have been proposed.

Most of such modifications have had to do with electrolyte compositions, but it has been found in general that not only are changes in electrolyte composition desirable but also that an increased quantity of electrolyte is required. The resulting wetness of the battery has led to difficulties in manufacture and has also aggravated the leakage problem.

The present invention has for its principal object an improved battery construction which obviates these difficulties. More specifically, it is an object of the invention to provide a battery construction particularly designed to confine an unusually wet mix, and another object is the provision of a substantially leakproof battery of this type.

In the drawing:

Fig. 1 is a vertical section of one type of battery construction embodying the invention;

Fig. 2 is an enlarged sectional detail view of a portion of the battery illustrated in Fig. 1;

Fig. 3 is a plan view of a suitable separator for use in the cells of the battery of Fig. 1;

Figure 4:
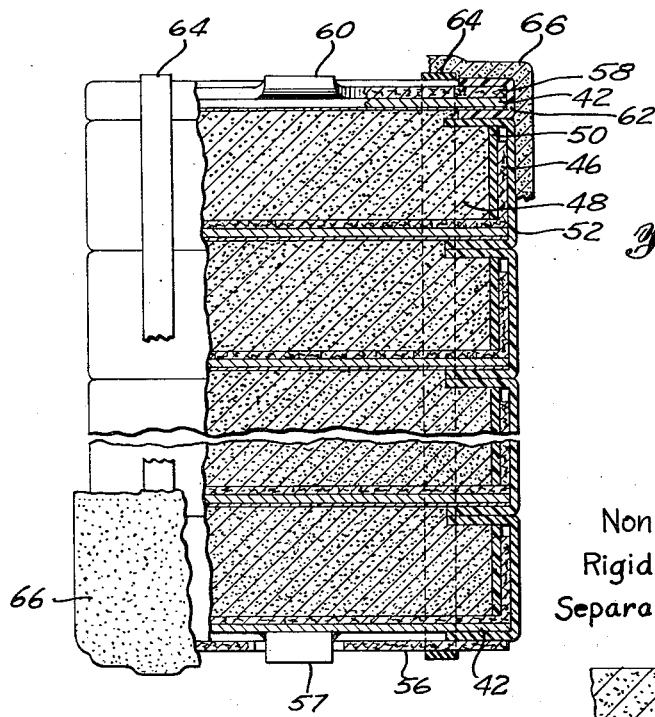
Fig. 4 is a view similar to Fig. 1 of another type of battery construction embodying the invention.

The battery of the invention comprises a stack of cells each containing an electrolyte-wet depolarizer mix and each having, in addition to an envelope or a container a mix-retaining collar. As will be explained more fully below, the depolarizer mix is separated from the anode of its cell by an improved separator, and the entire battery is provided with an external layer of wax.

Referring to Figs. 1 to 3 of the drawing, a battery B embodying the invention comprises a plurality of trays 10, each containing cell components so arranged that when the trays are assembled the cell components will be in electrical contact in series relationship. Each of the trays 10, has an outwardly-flared, up-standing, side-wall portion adapted to receive the bottom portion of another tray, and the bottom side-wall portion of each tray 10, is adapted to fit into the up-standing portion of another.

The trays 10, in accordance with this invention are composed of a flexible, non-rigid, electrolyte-proof plastic. As best shown in Fig. 2, the bottom of each tray 10 is open to permit electrical contact between cell components. In the bottom of each of the trays 10 is a duplex electrode 12 of zinc having a conductive carbon coating 14, the electrode being placed in the tray and preferably cemented thereto as shown in Fig. 2 with the carbon coating 14 down. A separator-blanket 16 of bibulous paper having a layer 18 of bibulous electrolyte-immobilizing material such as the conventional starch pastes used in dry cells is placed next the zinc surface of the electrode 12. The separator 16, as shown in the drawings, is so arranged as to line the inner walls of the tray 10 and for convenience may be pre-cut into the modified Maltese-cross shape illustrated in Fig. 3. The edges 20 of the separator 16 are preferably waterproofed, for example by a coating of wax. The depolarizer mix 22 for each cell is wet with electrolyte and is retained in a rigid plastic collar 25 placed adjacent to the separator-blanket 16. A boss 23 is preferably formed in the top of the mix cake to provide good contact with the carbon coating 14 of the duplex electrode 12 of the adjacent cell when the battery is assembled. In manufacturing the battery of the invention, the mix 22 may be molded into the collar 25 before it is placed in the tray 10 or after as desired.

The battery B is assembled in conventional manner by nesting the requisite number of trays 10 together to attain the desired voltage, terminal connections being provided at opposite ends of the battery in the following manner. For connection to the zinc electrodes, one end tray 10 contains a zinc electrode 24 from which a carbon coating is omitted. An electrically insulating end board 26, suitably of fiber board having an aperture therein for a terminal connection 28, underlies the zinc electrode. A similar construction for providing terminal connection to the carbon electrodes 14 comprises an end board 30 having an aperture therein for a terminal 32 which may be attached in conventional manner to, or form a part of, the carbon-coated zinc electrode 12 of the other end cell of the battery. The end board 30 and electrode 12 are embraced by an elastic, electrically insulating band 34 within the upper portion of an end tray 10, and that portion of the tray is turned inwardly as shown at 36 in Fig. 1 to complete the closure of the end cell of the battery. The entire assembly is held together under endwise pressure, as by elastic bands 38 and is provided with a layer 40 of electrolyte-proof sealing material such as microcrystalline wax.

Figure 5:
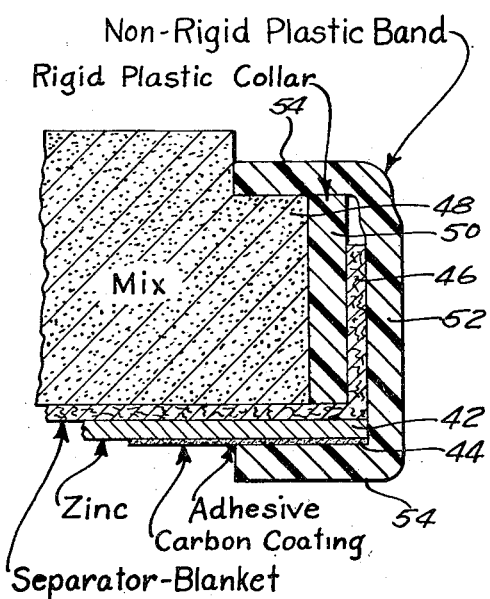
Fig. 5 is an enlarged sectional view of a portion of the battery illustrated in Fig. 4.

An alternative construction for a battery embodying the invention is illustrated in Figs. 4 and 5. The principal difference between this type of construction and that illustrated in Figs. 1 to 3 lies in the fact that the cell components, that is the duplex zinc electrode 42 with carbon coating 44, separator-blanket 46, electrolyte-wet mix 48 and rigid plastic mix-retaining collar 50 are assembled with non-rigid plastic bands 52 having inwardly turned ends 54. The battery is composed of a stack of the cell-component assemblies, provision for terminal connection to the zinc electrodes being made at one end and comprising an end-board 56 having an aperture therein for a terminal connection 57 attached to the zinc electrode 42 of the end cell having no carbon coating and a similar end-board 58 through which projects a terminal 60 attached to or forming a part of the duplex electrode 42 of the other end cell. The end-board 60 and duplex electrode 42 are suitably held together by an elastic, electrically insulating band 62. The assembled battery is held under endwise pressure by elastic bands 64 and is provided with a layer 66 of electrolyte-proof sealing material such as microcrystalline wax.

Figure 6:
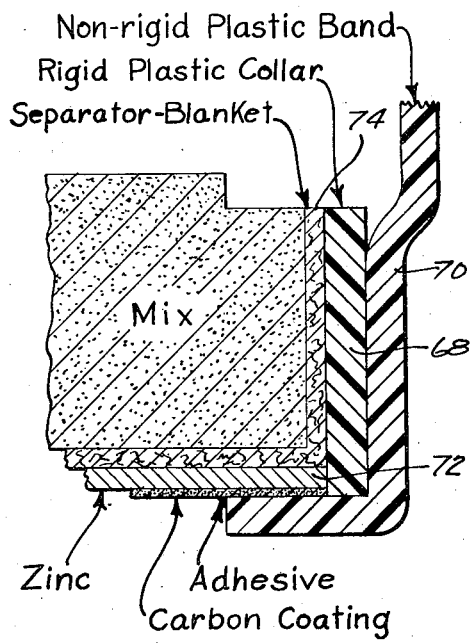
Fig. 6 is a view similar to Fig. 5 showing an alternative construction.

In an alternative assembly of cell components illustrated in Fig. 6, the mix-retaining collar 68 is placed adjacent to the plastic band or tray 70. In this arrangement the edges of the duplex electrode 72 abut the collar 68, and the separator-blanket 74 lines the inside of the collar 68.

The battery construction of the invention provides advantages in manufacture. Among such advantages, the molding of depolarizer mix into the mix-retaining collar provides an easily-handled unit which is far less fragile and subject to damage during assembly of the battery than the conventional molded mix tablet unprotected on its edges. This advantage is realized in all of the examples illustrated in the drawing save that of Fig. 6 wherein the separator and duplex electrode are placed within the collar.

In the tray-type construction illustrated in Figs. 1 and 3, the cell components are merely dropped into their respective trays and the trays nested together. The trays being of non-rigid plastic are readily deformable so that the upper portion of each yields to receive the lower portion of another and engages it tightly, making unnecessary any further sealing. In the construction illustrated in Figs. 4 and 5, the cell components, duplex electrode, separator, and depolarizer mix in the mix-retaining collar, are assembled and the plastic band placed about them. The edges of the plastic band are then raised to turn inwardly and grasp the bottom marginal portions of the duplex electrode and the top marginal portion of the depolarizer mix cake. This may be accomplished by warming the thermoplastic band to soften it.

The mix-retaining collar in the batteries of the invention not only provides advantages in the assembly and handling of its elements but also makes possible the use of a wetter mix. Ordinarily, in a dry battery for general purpose use, moisture, including the immobilized aqueous electrolyte, is present in amount not more than about 58% by volume of the mix. In heavy duty batteries and especially in batteries for use at low temperatures the moisture content of the mix is at least about 65% by volume and may be as much as 70% or even more.

The high proportion of moisture in such batteries of course makes the mix pastier and more difficult to maintain in its proper place. When the stack of cells is compressed to form the battery, the pasty mix has a tendency to be forced out of place or the liquid to be exuded from it. The mix-retaining collar provided in the battery of the invention confines the mix and thus avoids the difficulties otherwise encountered in the use of unusually wet mixes.

Further, the mix-retaining collar permits the use of non-rigid plastic trays or wrappers for assembled cell components which are advantageous in providing a tighter fit between the individual elements of the cell and between the assembled units of the battery. This tighter fit is particularly desirable in batteries having unusually wet mixes, for it tends to minimize the leakage problem. The mix-retaining collars being of rigid plastic also provide the necessary physical strength required to withstand the heavy pressure under which the batteries are assembled as well as to withstand the normal physical abuse encountered in service.

The non-rigid plastic envelope utilized in the battery construction of the invention is of a thermoplastic material such as a polymer or copolymer of a vinyl derivative, or may be of rubber or a rubber derivative. Preferably it is composed of a copolymer of vinyl chloride and vinyl acetate. The rigid plastic mix-retaining collar should be of a material compatible with that of the envelope and preferably is of the same material.

Although the battery construction of the invention has been described with particular reference to low temperature use, it is suitable generally for use in batteries of unusually wet mixes whether or not the batteries will be called upon for low temperature service.

In the copending application Serial No. 361,158, filed concurrently herewith by Albert F. Vinal, a novel depolarizer-mix support is described and claimed which may be used in the battery construction of this invention.

What is claimed is:

1. In a low temperature primary galvanic battery with a high electrolyte content comprising a plurality of cells arranged in series stacked relation, each of said cells comprising a carbon electrode, an immobilized aqueous electrolyte, an electrolyte-wet depolarizer mix wherein the moisture contained is over 58 percent by volume of said mix, and a zinc electrode, the combination of non-rigid, plastic envelopes, each including cell components which when grouped, form a battery and a rigid, non-absorbent, plastic depolarizer-mix-retaining collar within each of said envelopes, said collar confining said wet mix and serving to prevent movement of said mix and distortion of said non-rigid envelope when said battery is assembled, said envelope completely enclosing the marginal portions of the carbon electrode of one cell and the zinc electrode, electrolyte and depolarizer mix of the adjoining cell, a separator blanket having a bibulous portion separating said mix from said electrode and a portion separating the outer walls of said collar from the inner walls of said envelope.

2. In a low temperature primary galvanic battery with a high electrolyte content comprising a plurality of cells arranged in series stacked relation, each of said cells comprising a carbon electrode, an immobilized aqueous electrolyte, an electrolyte-wet depolarizer mix wherein the moisture contained is over 58 percent by volume of said mix, and a zinc electrode, the combination of non-rigid, plastic envelopes each including cell components which when grouped form a battery, and a rigid, non-absorbent, plastic depolarizer mix-retaining collar within each of said envelopes, said collar confining said wet mix and serving to prevent movement of said mix and distortion of said non-rigid envelope when said battery is assembled, said envelope being in the form of a tray having an outwardly-placed up-standing side-wall portion and a bottom side-wall portion, the upper portion of said envelope being adapted to receive the bottom portion of another, and the bottom portion of said envelope being adapted to fit the upper portion of another, whereby said envelopes are nested, a separator blanket having a bibulous portion separating said depolarizing mix from said zinc electrode and a portion separating the outer walls of said collar from the inner walls of said envelope and extending beyond the level of the mix to overlap the next adjacent nested unit.

References Cited in the file of this patent

UNITED STATES PATENTS

| | | |
|---|---|---|
| 2,272,969 | French | Feb. 10, 1942 |
| 2,307,767 | Deibel | Jan. 12, 1943 |
| 2,375,875 | Sanderson | May 15, 1945 |
| 2,505,835 | Richardson et al. | May 2, 1950 |

FOREIGN PATENTS

| | | |
|---|---|---|
| 558,207 | Great Britain | Dec. 24, 1943 |
| 235,835 | Switzerland | May 1, 1945 |